United States Patent [19]

Huff et al.

[11] Patent Number: 4,961,485
[45] Date of Patent: Oct. 9, 1990

[54] OIL CIRCULATION IN WHEEL HEAD TRANSMISSION

[75] Inventors: Martin Huff, Tettnang; Ulrich L. Kuchelmeister, Friedrichshafen, both of Fed. Rep. of Germany

[73] Assignee: Zahnradfabrik Friedrichshafen AG, Fed. Rep. of Germany

[21] Appl. No.: 346,832
[22] PCT Filed: Sep. 29, 1987
[86] PCT No.: PCT/EP87/00557
  § 371 Date: Mar. 28, 1990
  § 102(e) Date: Mar. 28, 1990
[87] PCT Pub. No.: WO88/02450
  PCT Pub. Date: Apr. 7, 1988

[30] Foreign Application Priority Data

Sep. 30, 1986 [LU] Luxembourg .......................... 00561

[51] Int. Cl.⁵ ...................... F16D 65/853; B60T 1/06
[52] U.S. Cl. .................................. 192/4 A; 74/391;
   475/331; 188/18 A; 188/71.6; 180/372
[58] Field of Search ............ 192/4 A; 74/391, 411.5,
   74/760, 785, 786, 788, 801; 180/370, 372;
   188/18 A, 71.5, 71.6, 264 D, 264 E; 475/331

[56] References Cited

U.S. PATENT DOCUMENTS

| | | | |
|---|---|---|---|
| 2,953,040 | 9/1960 | Christenson et al. | 74/781 |
| 3,301,359 | 1/1967 | Cole et al. | 192/4 A X |
| 3,439,766 | 4/1969 | Dence et al. | 192/4 A X |
| 3,754,625 | 8/1973 | Voth et al. | 192/4 A |
| 4,037,694 | 7/1977 | Keese | 192/4 A |
| 4,173,269 | 11/1979 | Craig | 188/71.5 |
| 4,407,382 | 10/1983 | Dziuba | 180/10 |
| 4,461,373 | 7/1984 | Pratt et al. | 192/4 A |
| 4,491,202 | 1/1985 | Schmitt | 188/71.5 |
| 4,540,073 | 9/1985 | Rogier | 192/4 A |
| 4,566,563 | 1/1986 | Chauveau et al. | 188/18 A |
| 4,616,520 | 10/1986 | Ehrlinger et al. | 74/325 |
| 4,624,353 | 11/1986 | Sailer et al. | 192/70.12 |
| 4,649,772 | 3/1987 | Daniel et al. | 74/785 |
| 4,655,326 | 4/1987 | Osenbaugh | 188/18 A |

FOREIGN PATENT DOCUMENTS

| | | |
|---|---|---|
| 058107 | 8/1982 | European Pat. Off. . |
| 143898 | 6/1985 | European Pat. Off. . |
| 0076387 | 4/1986 | European Pat. Off. . |
| 3013431 | 11/1981 | Fed. Rep. of Germany . |
| 3248250 | 3/1984 | Fed. Rep. of Germany . |
| 3545369 | 7/1986 | Fed. Rep. of Germany . |

Primary Examiner—Richard Lorence
Attorney, Agent, or Firm—Davis, Bujold & Streck

[57] ABSTRACT

A drive wheel with a friction brake having a circulating coolant in which feeding and draining take place in a non-rotational axle pipe (1) and the ring-gear carrier (2), attached thereto, without the heated coolant flowing through a planetary transmission (19, 20) supported between a half-shaft (14) and a ring gear (13). The collant enters radially beneath the brake discs (11, 12), retained by a brake-disc carrier (15), into an collecting annular space (27) and is thrown outwardly by centrifugal force between the brake discs (11, 12). It is returned to a cooler, situated outside the area of the transmission, by a coolant drain pipe (24) in the external hub collar (7) of the ring-gear carrier (2). By providing different seals (5.1; 17.1; 17.2; 15.1) at the connecting points of the brake and the transmission, the mixing of the brake coolant with the transmission lubricant is prevented. By this arrangement the transmission and the brake, together with the ring-gear carrier (2), can be dismounted from the axle pipe (1) as complete unit despite the connections without the need to dismount the wheel or jack up the vehicle.

5 Claims, 1 Drawing Sheet

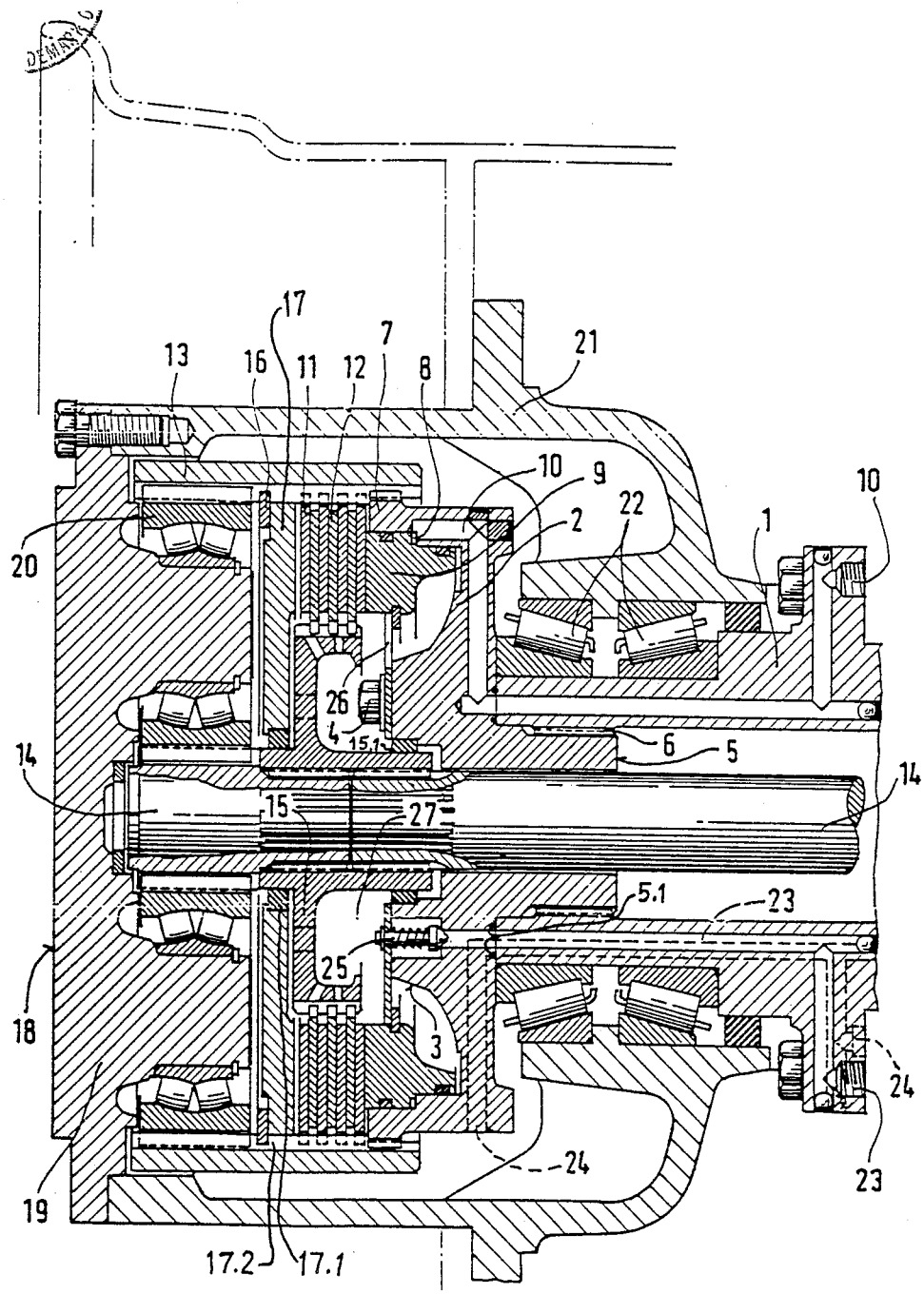

OIL CIRCULATION IN WHEEL HEAD TRANSMISSION

The invention concerns wheel drives having a friction brake. Such friction brakes are particularly used for heavy industrial vehicles with liquid recirculation cooling in order to obtain a long duration of the friction lining and high operational safety. A transmission of this kind is known, for instance, in EP 00 58 107. Here the cooling takes place by transmission oil which is radially passed through the brake discs and guided in, and removed from, the pipes that extend within the rotary half-shaft. In said construction, there is no support of the brake discs between the half-shaft and the ring gear and thus there is no especially high speed difference and therefore no high specific braking power. Besides, the planetary transmission, due to its arrangement between the bearing and the brake, is traversed by hot cooling oil and therefore can also be damaged by brake friction. An eventual repair of the transmission would always require complete dismantling of the brake. The dismantling of the whole, not dismember wheel head, including the ring-gear carrier, is not possible without propping the vehicle up, since the hub of the ring-gear carrier supports the wheel bearings and the transmission housing can be dismantled only by breaking up the wheel in several axially divided components. Finally, the accommodation of the oil feed pipe in rotating shafts is expensive, causes sealing problems, and is not suitable for steering axles. A higher brake pressure is also required in the known brake, since the brake cylinder and the discs proper cannot be adequately designed with a clearly larger diameter than the pitch of the planetary shafts. Finally, in this brake, constantly traversed to a maximum by oil, there continuously results a considerable need of energy for the constantly stressed pump and the drag torques between the friction brakes, since an emergency control dependent on the brake actuation is missing.

The problem to be solved by the invention on the basis of the above is to provide a drive wheel having a friction brake in which the cooling system is improved and feeding of the coolant activatable only upon braking takes place via non-rotating, tightly attached parts of the axle housing, there being also obtained an arrangement that spares brake pressure and protects the transmission, making possible, without disassembling, an optimal cooling effect without great impairment of the transmission due to brake heat or friction and a practical disassembling of the transmission.

The solution is obtained by the fact that all feed pipes discharging in the transmission housing pass beneath the bearing of the wheel into the non-rotating axle housing and the drain from the oil ring that forms in the ring gear above the outer edge of the ring-gear carrier there immersed and the axle pipe are provided with a direction that offers good cooling possibilities. The remaining structural assembly of the wheel head provides the arrangement of the brake between planetary transmission and ring-gear carrier or bearing in a manner such that the bores in the wall of the axle pipe are sealed axially and statically, the same as reliably and free of wear, by the annular flange that serves as ring-gear carrier. By means of the compact brake system that is easy to assemble, any impairment of the transmission due to heat accumulation or friction, or of the bearing, even in case of continued braking is reliably avoided.

The brake discs and the brake cylinder can also be designed more effectively and in shorter version with approximately the same external diameter as in the ring-gear carrier and also without second inner support of the planetary shaft. Besides, their dismantling without dismembering from the axle pipe end is possible without propping up the vehicle. The use for steering axles poses no problem.

Another drive wheel with attachment to a circulation cooling system has also been disclosed in EP 00 76 387. But here the brake is accommodated in an extra housing that externally surrounds the bearing and thus axially enlarges the wheel head, and the brake discs likewise have only one support between the axle pipe and the wheel so that a higher speed difference between axle pipe and drive shaft likewise cannot be used here. Besides, the slip ring seals between transmission and brake housing, which require maintenance, are here inaccessible.

Compared to this known brake system, the invention also has the advantage that the outer surfaces of the heavily loaded bearings in the wheel hub are not encased by a tilted brake housing and only a slight transmission of heat from the oil drain to the bearing is possible. A high heat load originating from the brake is avoided, since the hub housing according to the invention does not serve as collecting space for hot oil and the brake oil that entails friction does not have to flow out axially through the transmissions.

According to the invention, it is also advantageous that a conversion of normal immersion lubrication of the wheel head gear, similar to that of the prior art disclosed in DE-B 30 13 431, is possible with the same structural parts without any other changes of dimension, and also that a replacement of brake discs or brake piston seals remains possible without dismantling the wheel, and also no additional external or relative rotating seals are needed on account of feed and drain pipes in a rotating structural part. By means of the annular duct in which the feed pipes discharge beneath a shaft collar used as brake-disc carrier, there is ensured an especially intensive and uniform cooling of the brake discs making use of centrifugal force. An increased separation of the lubricating liquids (oil) in the transmission proper and in the wheel bearing from the eventually different coolant used for brake cooling takes place here by providing annular gap seals, accessible without dismantling the wheel bearing in the case of repairs, on the ring gear and the brake pressure plate in a manner such that neither a disadvantageous mixing of the different substances nor an excessive heating of the bearing due to hot brake oil is possible.

The aforementioned pressure cooling device does not refer to any drive wheel wherein the ring-gear carrier is also an external disc carrier of the brake, accommodates the piston, and requires special friction discs with unfavorably wide annular surfaces and large axial port holes. The latter, in addition, gives only an insufficient cooling effect in the discs placed farther away from the oil inlet, since no oil-collecting space with pocket-like cross section is provided beneath the disc carrier. Also missing here are all the steps for arranging the pipes in the axle pipe and for protecting the transmission against hot contaminated oil.

Similar to a system disclosed in EP-A 01 43 898, the brake cooling here can be controlled at will in a manner such that flushing of the friction surface gap occurs only when actually braking, but when brakeless driving slip torques due to overflowing of the cooling liquid are avoided. For this purpose, cover elements such as valve covers or sheet metal vanes are hinged on the service brake piston.

The invention is not limited to the combination of features of the claims. Other logical combinations of features are possible for the expert when a problem arises.

The invention is explained in detail herebelow with reference to an embodiment. The figure is a partial cross sectional view through a drive wheel having a friction brake according to invention. In the drawing a ring-gear carrier 2 designed as annular flange is positively and tightly flanged before an axle pipe 1 on the transmission side. The ring-gear carrier 2 has an inner hub collar 3 on the transmission side through which a fastening screw 4 is passed from the transmission side into the front side on the transmission side of the axle pipe 1. In the embodiment, another internal but transmission remote gear-hub collar 5 of the ring-gear carrier 2 is provided with an external gearing which engages an internal gearing 6 of the axle pipe 1.

In another embodiment, the ring-gear carrier 2 can be provided on the external side of the axle pipe 1 directly beneath the wheel bearing without impairing the invention.

The fastening screw 4 also can consist either of the studs that axially penetrate the hub collar 5 of the ring-gear carrier 2 and mesh with the axle pipe 1 at face end or of a large, non-torsional threaded nut on an external thread of the axle pipe 1 upon which the ring-gear carrier 2 is shoved.

The external annular rim of the ring-gear carrier 2 surrounds an annular cylinder 8 of the service brake through which an annular piston 9 of the service brake can be applied against the brake discs 11, 12 when fluid is fed via pressure lines 10 of the service brake introduced in the ring gear carrier 2 and in the axle pipe 1. The external brake discs are axially movable but non-torsionally held in a ring gear 13 non-torsionally held by the ring-gear carrier 2. The internal brake discs 12 can be carried along in the direction of rotation by a brake-disc carrier 15 driven by the half-shaft 14 and are likewise axially movable. When pressure is applied by the piston 9, all the brake discs abut against a brake pressure plate 17 which is axially secured to the ring gear 13 by a guard ring 16 and, in the embodiment, downwardly reaches a rotary seal, 15.1 via the half-shaft 14 or the hub of the brake-disc carrier 15 so that the region of the brake 11, 12 is thoroughly impermeably separated from the area of the attached planetary transmission. Said planetary transmission essentially consists of a set of planetary gears 20 that are supported on a housing cover 18 on the face end by means of planetary shafts 19 and rest against an internal gearing of the ring gear 13, thus driving the housing cover 18 together with the transmission housing 21 flanged thereon at greatly reduced speed, which here also serves as rim flange. The transmission housing 21 can be provided with cooling vanes or other surface design favorable to cooling, since no superstructure is required above the bearing 22 which is supported on the axle pipe 1 on the brake-remote side of the ring gear 2. The bearing 22, which, in the embodiment, consists of two taper roller bearings, is also axially forced by the fastening screw 4 against an external annular collar of the axle pipe 1 provided on the brake-remote side. The feeding of different fluids in separate pipes, namely, service brake pressure 10, coolant feed pipe 23, coolant drain pipe 24, also takes place via said outer annular collar of the axle pipe 1 secured to the chassis. For this purpose, bores parallel to the axle pipe are uniformly staggered on the periphery of the axle pipe 1 and in the hub collar 3 on the transmission side of the ring-gear carrier 2 and additionally sealed 15.1 at the point of contact of the ring-gear carrier 2 with the axle pipe 1. The coolant feed pipe 23 discharges substantially at the height of the pitch of the fastening screw 4 and, in the embodiment, is normally shut-off by tongue-like cover elements 25, which can be taken along by the brake piston 9 in an axial direction. When the braking piston 9 is actuated, it carries along said shut-off elements 25 into a position wherein the coolant feed pipe 23 is opened. When the service brake pressure 10 is removed, the annular piston 9 of the service brake is returned to its original position, as far as possible in the ring-gear carrier 2, by the recoil springs 26, not separately shown, which can consist of, for instance, sheet springs held by the fastening screw 4 and hinged outside on the piston 9 whereby the coolant feed pipe 23 is again blocked. Here the design of the shut-off elements 25 is as desired. The coolant drain 24 takes place via inlet apertures of the coolant drain pipe 24, which are placed on the outer hub collar 7 and through which the heated coolant is returned to a cooler, not shown. The cooled coolant radially exiting beneath the brakes 11, 12 into an oil-collecting annular space 27 can then be shoved with higher speed, making use of centrifugal force, through radial bores provided in the external rim of the brake-disc carrier 15 into the friction surface area between the brake discs 11, 12 and optionally be radially conveyed by the ring gear 13 against the inner wall of the transmission housing. Here the coolant cannot mix with the lubricant of the planetary transmission 14, 19, 20 or with that of the bearing 22 if gap seals, 17.1, 17.2, 15.1 and 5.1 not shown in detail, are applied in front of them, and thus normal immersion lubrication or greasing can take place. For assembling and disassembling the arrangement shown, the whole ring gear 13, including ring-gear carrier 2, planetary transmission 19, 20 and brake 15, can be screwed off the flange of the axle pipe 1 without the wheel or the transmission housing 21 having to be removed from the bearing 22. The brake-disc carrier 15 can also be provided in its radial web with axial apertures to make it possible to mount it also with the outer rim projecting on the transmission side.

The cooling of the coolant and the pumping thereof can take place at a central location in any way desired, even together with other branch streams of coolant, without impairing the space conditions in the wheel hub. Where needed, the logically equal arrangement can advantageously be used also for steerable wheel head transmissions, since no enlargement of the outer dimensions of the head-wheel transmission are required for oil circulation.

The control of the coolant supply, in addition, can also be combined with the brake actuation means outside the wheel head in a manner known per se so that, for instance, the pump for the supply of coolant be connected only during braking operations.

REFERENCE NUMERALS 1. axle pipe
2. ring-gear carrier
3. hub collar on the transmission side, inside 2
4. fastening screw 5. gear hub collar transmission-remote of 2
5.1 contact seals between 1 and 2
6. internal gearing of 1
7. hub collar on the transmission side, outside 2
8. annular cylinder of the service brake
9. annular piston of the service brake
10. fluid feed pipe of the service brake
11. brake discs, outside
12. brake discs, inside
13. ring gear
14. half-shaft
15. brake-disc carrier
15.1 rotary seal between 2 and 15
16. guard ring in 13
17. brake pressure plate
17.1 gap seals between 17 and 13 or 15
17.2 gap seals between 17 and 13 or 15
18. housing cover
19. planetary shaft
20. planetary gears
21. transmission housing
22. bearing for 21
23. coolant feed pipe
24. coolant drain pipe
25. cover elements
26. recoil springs
27. oil-collecting annular space

We claim:

1. A drive wheel having a housing (21) designed as wheel hub and a wheel-head cover (18), designed as planetary carrier, having planetary gears (20) supported thereon which mesh with a sun gear driven by a rotatable half-shaft (14) and a ring gear (13) connected via a ring-gear carrier (2) with an axle pipe (1), and said housing (21) being supported by bearing means (22), said drive wheel having a liquid-cooled fluid-actuatable disc brake (11, 12) with external brake discs (11) being non-rotationally connected with said ring gear (13) and internal discs (12) being non-rotationally connected, via a brake disc carrier (15), with said half-shaft (14), said brake-disc carrier (15) having an collecting annular space (27) and radial bores situated in an external rim thereof, and an annular piston (9) of the disc brake being inserted in an external hub collar (7) of said ring-gear carrier (2) and forming therewith a brake annular piston which can be activated by fluid provided via a fluid pipe (10) in said ring-gear carrier (2) and in said axle pipe (1), characterized in that a coolant feedpipe (23) and a coolant drain pipe (24) pass through a bore of said bearing means (22) in the wall of said axle pipe (1) separately from said fluid pipe (10), said collecting annular space (27) has a pocket-like cross section and said coolant feedpipe (23) is located, on a transmission side, in an internal hub collar (3) of said ring-gear carrier (2) and discharges coolant on a side of said axle pipe (1) radially beneath said brake discs (11, 12) in a manner such that said coolant flows from said coolant feedpipe (23) into said collecting annular space (27), and cover means (25) closes coolant flow through said coolant feedpipe (23) when said brake (11, 12) is disengaged, but said cover means (25) is axially movable by said brake annular piston (9) to open the flow of coolant through said coolant feedpipe (23) when said brake (11, 12) is engaged.

2. A drive wheel according to claim 1, wherein said drain pipe (24) for said coolant of said housing (21) is provided radially within said ring-gear carrier (2), has an opening in the periphery of the external hub collar (7) and has an axial seal with said axle pipe (1).

3. A drive wheel according to claim 1, wherein both said fluid pipe (10) and said coolant feedpipe (23) extend through said axle pipe (1) and both pipes are provided with contact seals (5.1) located between said axle pipe (1) and said internal hub collar (3) of said ring-gear carrier (2).

4. A drive wheel according to claim 1, wherein sealing elements are provided between said planetary transmission (19, 20) and said brake discs (11, 12) to keep said coolant away from said planetary transmission (19, 20).

5. A drive wheel according to claim 1, wherein annular gap seals (15.1, 17.1, 17.2), facing toward said ring gear (13) and a brake pressure plate (17), are provided between said transmission (19, 20) and said disc brake (11, 12).

* * * * *